United States Patent

Takiyama

Patent Number: 5,398,377
Date of Patent: Mar. 21, 1995

[54] PLASTIC HINGE

[75] Inventor: Isamu Takiyama, Osaka, Japan

[73] Assignee: Nippon Aspherical Lens Co., Ltd., Osaka, Japan

[21] Appl. No.: 111,407

[22] Filed: Aug. 25, 1993

[51] Int. Cl.⁶ .............................. G02C 5/22
[52] U.S. Cl. .................. 16/228; 16/DIG. 13
[58] Field of Search .............. 16/228, DIG. 13

[56] References Cited

U.S. PATENT DOCUMENTS

| 3,156,756 | 11/1964 | Seaver | 16/228 |
| 3,744,887 | 7/1973 | Dunbar | 16/228 |
| 4,699,479 | 10/1987 | Metcalfe | 16/228 |

FOREIGN PATENT DOCUMENTS

| 495767 | 1/1992 | European Pat. Off. | 16/228 |
| 2943067 | 5/1981 | Germany | 16/228 |

Primary Examiner—P. Austin Bradley
Assistant Examiner—Chuck Y. Mah
Attorney, Agent, or Firm—Nikaido, Marmelstein, Murray & Oram

[57] ABSTRACT

A pivotal support portion 2 protruding from a frame 1 is clamped between a pair of clamp ends 4 provided at the tip of an earpiece 3. A protrustons 7 formed in the inner surface of each of said pair of clamp ends 4 is fitted within a corresponding pivot hole 6 in each of the upper and bottom surface of said pivotal support portion 2. A lock mechanism 11 including protuberances 12 and recesses 13 is provided at a position where said clamp ends 4 are contacted with said frame 1. When said earpiece 3 is opened or enlarged to the maximum open position, said protuberances 12 become fitted within said respective recesses 13, so as to prevent said clamp ends 4 from separating in the outward direction.

6 Claims, 4 Drawing Sheets

PLASTIC HINGE

FIELD OF THE INVENTION

This invention relates to an improved plastic hinge, for example, for use in a connection part or side joint of a pair of glasses for connecting a frame or rims and sides or earpieces.

BACKGROUND OF THE INVENTION

In glasses of a plastic material, a frame 20 and an earpiece 21 can be connected together by means of a plastic hinge 22, as shown in FIG. 6. The plastic hinge 22 is so constructed that a pivotally supporting portion or support portion 24 formed integrally with the frame 20 at one end thereof can be clamped by a pair of vertically spaced clamp ends 25 formed in the earpiece 21 at one end thereof. The support portion 24 is formed with pivot holes 28 in the top and bottom faces thereof, respectively. The clamp ends 25 include a protrusion 27 in their respective inner surfaces (the surfaces to be contacted with the support portion 24). The protrusions 27 are inserted into respective pivot holes 26. Thus, the earpiece 21 can be openably closed or pivoted about the axis X'—X' passing through the pivot holes 26 and the protrusions 27, as shown by the arrow mark in FIG. 6.

When the earpiece 21 is assembled to the frame 20, it is necessary for an operator, manually or using an appropriate jig, to widen the vertical distance between the clamp ends 25, so as to place the protrusions 27 fitted within the pivot holes 28 in the pivotal support portion 24. To this end, the earpiece 21 is usually formed, at the end thereof, with a notch 28, so that the clamp ends may be easily widened. It is noted, however, that the clamp ends 25 would not withstand a force which tends to urge the protrusions 27 out of the pivot holes 28, when a user intends to wear glasses by opening the earpieces 21, thus causing dislodgement of the protrusions 27 from the pivot holes 26. Same inconvenience may occur, when extraordinary external force, such as axial or torsional force or impact is applied to the earpieces 21.

SUMMARY OF THE INVENTION

The principal object of the invention is to provide a plastic hinge of a simple construction by which the frame and earpieces may be rigidly connected. In order to achieve the above object, the present invention provides a plastic hinge comprising a pivotal support portion attached to a base, and a movable member, the pivotal support portion including a pair of pivot holes in the opposite surfaces thereof, the pair of pivot holes having a common axis, the movable member including, at the tip portion thereof, a pair of clamp ends for clamping the pivotal support portion therebetween, each of the clamp ends having a protrusion in the inner surface thereof, the protrusions being fitted within the respective pivot holes so that the movable member is pivotably connected to the pivotal support portion for open-close movement, the movable member being restricted from moving in the open direction due to the engagement between end surfaces of the clamp ends and the base, wherein the plastic hinge comprises a lock mechanism for preventing separation between the pair of clamp ends due to the inter-engagement between protuberances and recesses disposed at positions where the clamp ends are contacted with the base.

In one embodiment, the protuberances are formed in the clamp ends, and the recesses are formed in the base. On the contrary, the protuberances and recesses may be formed in the base and the clamp ends, respectively.

The lock mechanism can be formed by a pair of protuberances disposed on the base in a spaced apart relationship with each other for clamping the pair of clamp ends therebetween.

Due to the above construction, and when the movable member is opened until the end surfaces of the clamp ends are contacted with the base, separation between the clamp ends may be prevented by means of the lock mechanism, so that the clamp ends will not be widened.

Accordingly, separation between the movable member and the base may be prevented, whereby rigid connection between the movable member and the base is achieved, thus increasing strength of the construction.

DETAILED DESCRIPTION OF THE PREFERRED EMBODIMENTS

Figure 1:
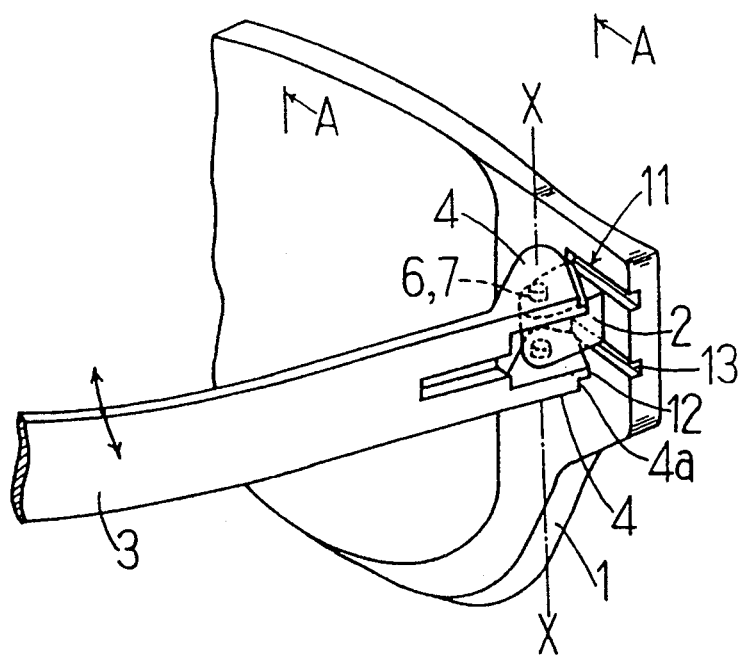
FIG. 1 is a perspective view illustrating one embodiment of the invention.

Several embodiments of the invention, when applied to a plastic hinge of glasses, will be explained below with reference to FIGS. 1 through 5. It is noted that, although such a plastic hinge is usually provided at each sides of a frame 1, only one plastic hinge is shown in the drawings.

As shown in FIG. 1, support portion 2 protruding from the frame or base 1 is clamped, in the vertical direction, by a pair of clamp ends 4 formed in an earpiece or movable member 3 at the forward end thereof. Like the above prior art plastic hinge, the support portion 2 is formed with a pair of pivot holes 6 in the top and bottom surfaces thereof. The pivot holes 6 are aligned with each other along an axis X—X. The clamp ends 4 are formed with a protrusion 7 In their respective inner surface (the surface to be contacted with the support portion 2). The protrusions 7 are fitted into the respective pivot holes 6. Since the earpiece 3 is pivotally connected to the support portion 2, as mentioned above, the earpiece 3 can be opened and closed relative to the frame 1 about the axis X—X, as shown by arrow mark in FIG. 1. The end surface 4a of each of the clamp ends 4 extends in a vertical plane. Thus, when the earpiece 3 is opened to a predetermined degree, the end surfaces 4a of the clamp ends 4 and the frame 1 exhibit a surface to surface contact therebetween, so that further open-operation of the earpiece 3 is prevented (the position of the earpiece 3 at this moment will be referred to as "maximum open position" hereinbelow).

Figure 2:
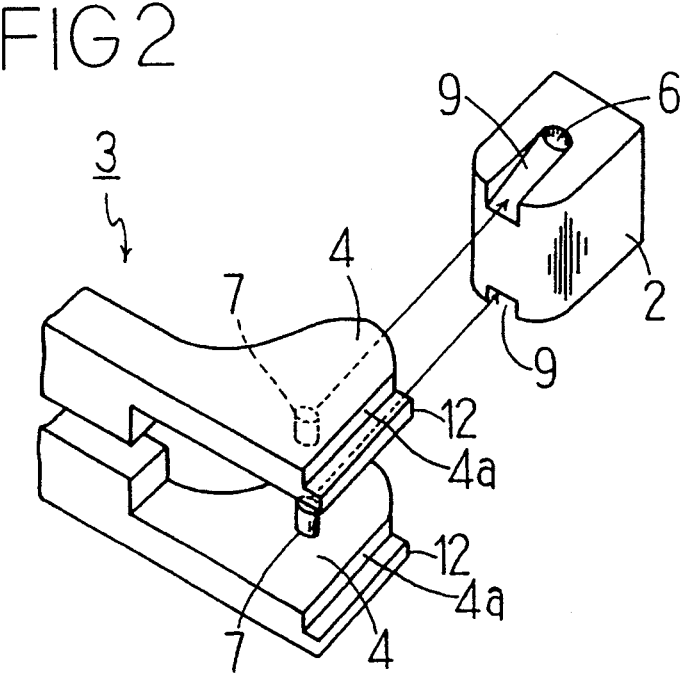
FIG. 2 is a perspective view illustrating a manner in which an earpiece is assembled to an support portion.

As shown in FIG. 2, a inclined guide groove 9 is formed in the top and bottom surfaces of the support portion 2 (the guide grooves are not shown in FIG. 1).

The guide grooves 9 extend from one end surface of the support portion 2 toward the respective pivot holes 6 so as to be diverged relative to one another. When the frame 1 is to be assembled with the earpiece 3, the earpiece 3 is pushed toward the support portion 2 with the tip end of each of the protrusions 7 of the clamp ends 4 received within the respective guide grooves 9. This causes the clamp ends 4 to be opened. Thus, the protrusions 7 may be easily fitted into the respective pivot holes 6, without the use of any Jigs, thereby obviating laborious works.

Figure 3:
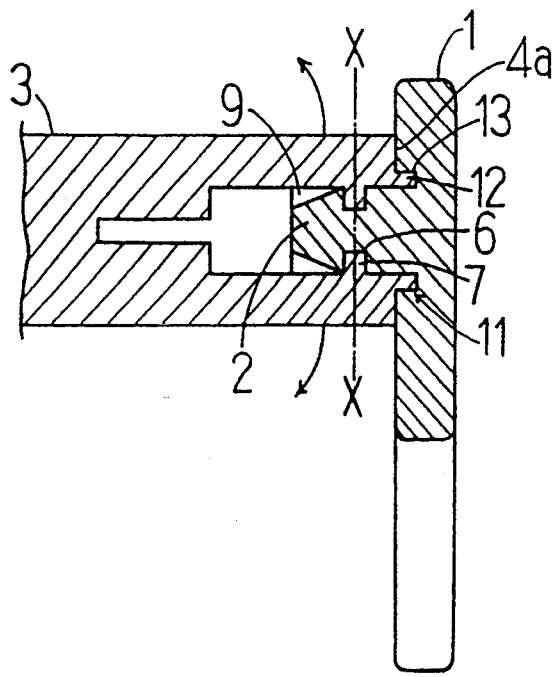
FIG. 3 is a vertical, sectional view along line A—A in FIG. 1.

The invention is featured by a provision of a lock mechanism 11 at a contact position between the clamp ends 4 and the frame 1. The lock mechanism 11 includes, as shown in FIG. 3, a protruding portion 12 formed in the end surface 4a of each of the clamp ends 4, and a pair of recessed portions 13 disposed vertically each sides of the support portion 2 and extending in parallel with each other. When the earpiece 3 is opened to its maximum open position, the protruding portions 12 are fitted into their respective recessed portions 13, as shown in FIG. 3, so as to prevent the clamp ends 4 from moving away from one another in the direction of arrow mark in FIG. 3. Thus, the clamp ends 4 will not be expanded or widened, even when extraordinary force, such as axial or torsional external force, is applied to the earpiece.

Figure 4:
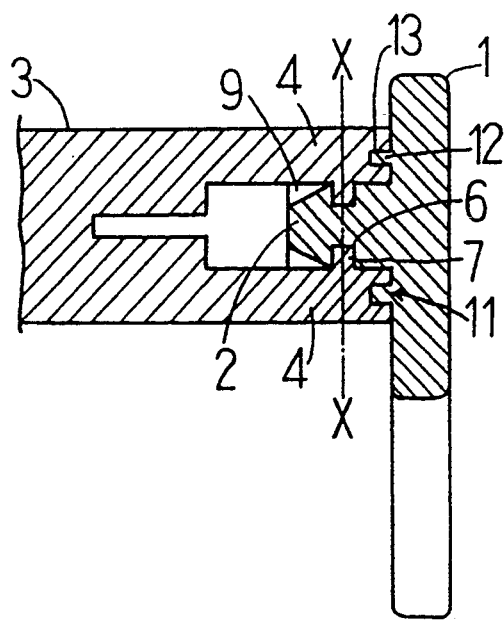
FIG. 4 is a vertical, sectional view illustrating a second embodiment of the invention.

A second embodiment of the invention is shown in FIG. 4. In this embodiment, .contrariwise to the embodiment shown in FIG. 1, a protruding portion 12 is formed in the frame 1, while a recessed portion 13 is formed in the end surface of each of the clamp ends 4.

Figure 5A:
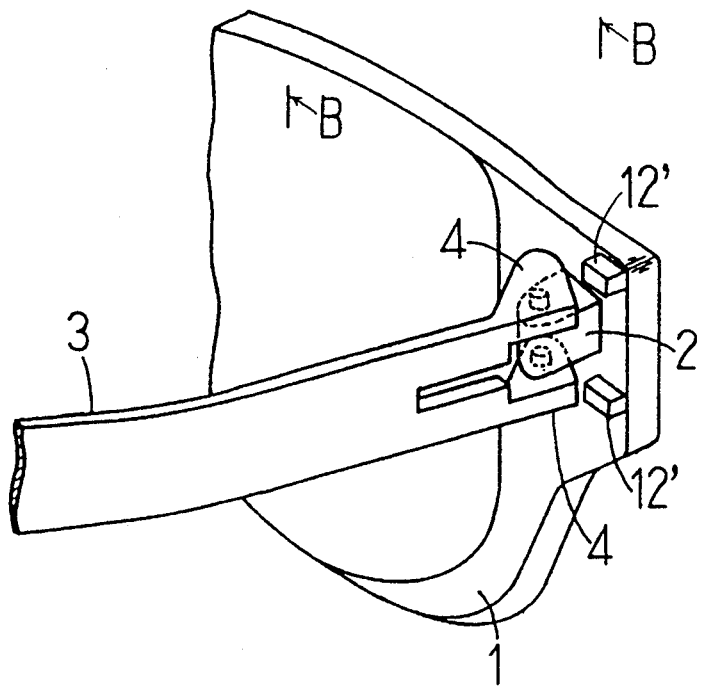
FIG. 5(a) is a perspective view illustrating a third embodiment of the invention.
Figure 5B:
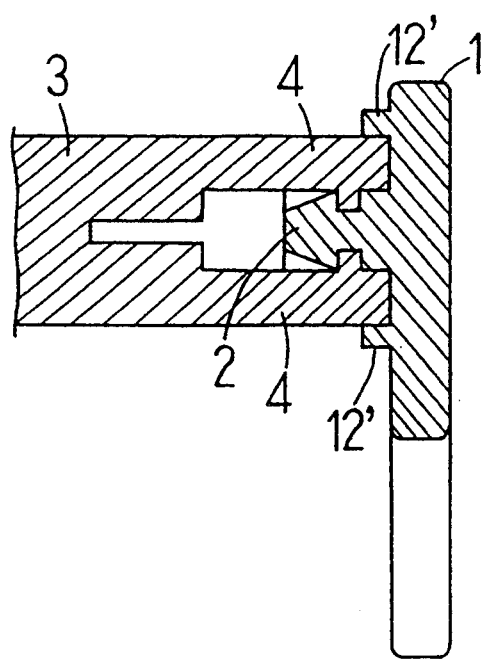
FIG. 5(b) is a vertical, sectional view along line B—B of FIG. 5(a).
Figure 6:
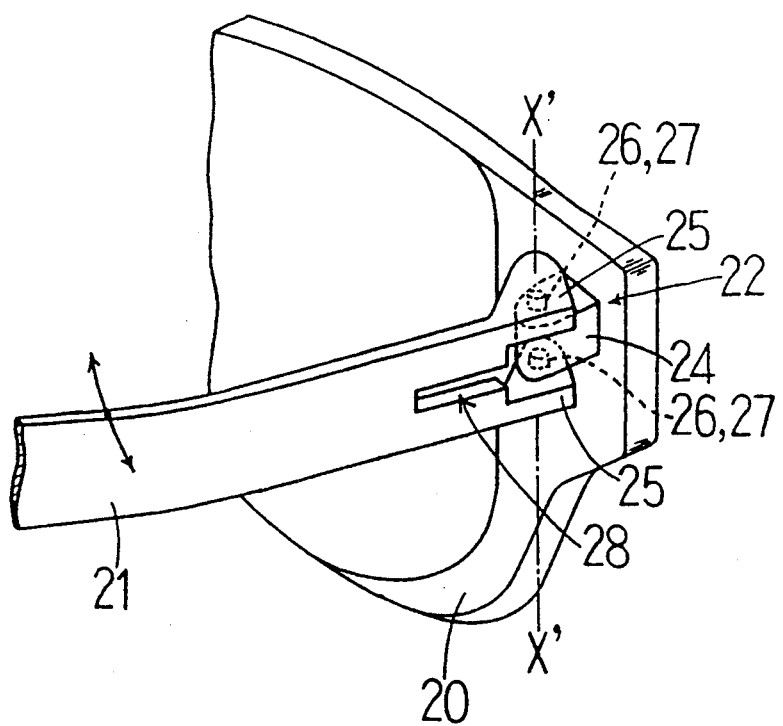
FIG. 6 is a perspective view illustrating prior art plastic hinge.

A third embodiment of the invention is shown in FIG. 5(a). In this embodiment, a pair of protruding portions 12' are provided at predetermined positions on the frame 1. The pair of protruding portions 12 serves to clamp the clamp ends 4 therebetween in the vertical direction. When the earpiece 3 is opened or enlarged to the maximum open position, the protruding portions 12 cooperate to urge the forward edges of the clamp ends 4 toward one another, as shown in FIG. 5(b), so as to prevent the clamp ends 4 from moving away from one another. Thus, it is possible to obtain advantages the same as those effected by the construction shown in FIG. 1 or FIG. 4.

It is noted that the configuration of the protruding portions 12, 12' and the recessed portions 13 are not limited to an elongated one. Substantially pointed protrusions and hole-like depressions, capable of being inter-engaged with each other, may be used. While, in the above embodiments, the protrusions 7 are formed in the inner surfaces of the clamp ends 4 and the pivot holes 6 are formed in the support portion 2, it is possible to provide the pivot holes 6 and the protrusions 7 in the inner surfaces of the clamp ends 4 and the support portion 2, respectively.

The material for the earpiece 3, frame 1, and the hinge is not limited to plastic material. The invention may be applied to any materials having elasticity or resiliency which may cause significant separation between the clamp ends 4. Accordingly, the term plastic herein used should be interpreted to be elastic material. It is noted further that the present invention may be applied to any kind of hinges which serve to connect a base member similar to the frame 1 with a movable member similar to the earpiece 3.

It is claimed:

1. A plastic hinge comprising a pivotal support portion attached to a base, and a movable member, said pivotal support portion including a pair of pivot holes in the opposite surfaces thereof said pair of pivot holes having a common axis, said movable member including, at the tip portion thereof, a pair of clamp ends for clamping said pivotal support portion therebetween, each of said clamp ends having a protrusion in the inner surface thereof, said protrusions being fitted within said respective pivot holes so that said movable member is pivotably connected to said pivotal support portion for open-close movement, said movable member being restricted from moving in the open direction due to the engagement between end surfaces of said clamp ends and said base, further comprising:

a lock means for preventing separation between said pair of clamp ends, wherein said means provides inter-engagement between protuberances and recesses disposed at positions where said clamp ends are contacted with said base.

2. A plastic hinge comprising a pivotal support portion attached to a base, and a movable member, said pivotal support portion including integrally therewith a pair of protrusions in the opposite surfaces thereof, said pair of protrusions having a common axis, said movable member including, at the tip portion thereof, a pair of clamp ends for clamping said pivotal support portion therebetween, each of said clamp ends having a pivot hole in the inner surface thereof, said protrusions being fitted within said respective pivot holes so that said movable member is pivotably connected to said pivotal support portion for open-close movement, said movable member being restricted from moving in the open direction due to the engagement between end surfaces of said clamp ends and said base, further comprising:

a lock means for preventing separation between said pair of clamp ends, wherein said means provides inter-engagement between protuberances and recesses disposed at positions where said clamp ends are contacted with said base.

3. A plastic hinge according to claim 1 or 2, wherein said lock means includes said protuberances formed in the clamp ends, and said recesses formed in said base.

4. A plastic hinge according to claim 1 or 2, wherein said lock means includes said recesses formed in said clamp ends, and said protuberances formed in said base.

5. A plastic hinge according to claim 1 or 2, wherein said lock means includes a pair of said protuberances on said base in a spaced apart relationship for clamping said clamp ends therebetween.

6. A plastic hinge according to claim 1, wherein each of said opposite surfaces of said pivotal support portion includes an inclined guide groove in communication with the opening of said pivot hole.

* * * * *